United States Patent [19]
Brobst et al.

[11] Patent Number: 6,125,382
[45] Date of Patent: Sep. 26, 2000

[54] DISTRIBUTED THREAD MECHANISM AND METHOD

[75] Inventors: Curtis H. Brobst; Chih-Hsiang Chou; Scott Neal Gerard, all of Rochester, Minn.

[73] Assignee: International Business Machines Corporation, Armonk, N.Y.

[21] Appl. No.: 08/900,755

[22] Filed: Jul. 25, 1997

[51] Int. Cl.[7] .................................................. G06F 9/00
[52] U.S. Cl. .......................................... 709/102; 709/102
[58] Field of Search ................................... 709/100, 102, 709/103, 107, 108

[56] References Cited

U.S. PATENT DOCUMENTS

| | | | |
|---|---|---|---|
| 5,430,876 | 7/1995 | Schreiber et al. | 709/304 |
| 5,596,579 | 1/1997 | Yasrebi | 709/304 |
| 5,765,157 | 6/1998 | Lindholm et al. | 707/101 |
| 5,787,281 | 7/1998 | Schreiber et al. | 709/304 |
| 5,812,844 | 9/1998 | Jones et al. | 395/674 |
| 5,881,315 | 3/1999 | Cohen | 710/52 |
| 5,892,944 | 4/1999 | Fukumoto et al. | 709/100 |

OTHER PUBLICATIONS

Sun Microsystems, Inc., "Java™ Remote Method Invocation Specification", Revision 1.4, Feb. 10, 1997, Section 3.6, p. 21.

Primary Examiner—Majid Banankhah
Attorney, Agent, or Firm—S. Jared Pitts

[57] ABSTRACT

According to the preferred embodiment of the present invention, a method and apparatus for facilitating communications between client objects and server objects in a distributed object system is provided. The method and apparatus provide a distributed thread that associates dedicated service threads with a distributed thread identification for each transaction. By associating a dedicated service thread with a distributed thread identification it can be assured that all portions of a transaction are performed by the same thread. Thus, the present invention assures consistent thread allocation in a distributed system.

31 Claims, 10 Drawing Sheets

DISTRIBUTED THREAD MECHANISM AND METHOD

BACKGROUND OF THE INVENTION

1. Technical Field

The present invention relates in general to object-oriented computer systems. More specifically, the present invention relates to the field of distributed object systems.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

The computer programs that run on modern computer systems are typically extremely complex. The execution of these modem computer programs is typically broken into sub-groups, called processes or tasks. Each process is generally assigned its own address space, such that different processes can operate concurrently without conflicts in resources. Each process can include one or more threads of control, or "threads." Threads share the address space of their parent process. This allows multiple threads to be spun off by the parent process without requiring excessive system resources. For these reasons, a thread is often described as a "light process."

Object oriented programming based on an object model is a new way of programming computer programs that has become very popular over the past several years. Computer programs written in object-oriented languages are known as object-oriented programs. Object-oriented programming differs from traditional procedural programming in that it uses objects, instead of procedures, as its fundamental building blocks. In the object model, each object contains encapsulated data and methods used to access the encapsulated data.

Objects interact with each other through method calls. These method calls are implemented by threads. For example, for an object A to call a method on an object B, a thread first gets object A. While running within A's method the thread then gets object B and calls one of B's method. Thus, all parts of the interaction are performed by the same thread. This interaction is referred to as "A calls B."

Object systems that allow interactions between objects in remote locations over a communications link are commonly referred to as distributed object systems. Where object A resides in one location, and object B resides in another location, "A calls B" becomes a remote call. The object making the call (Object A) is generally referred to as a "client object" while the object receiving the call and performing the function (Object B) is generally referred to as a "server object." In a distributed system the client object and the server object are in remote locations and are running under different threads ("client thread" and "server thread" respectively). More specifically, when object A makes a remote call to object B the client thread is suspended and a server thread on the server side is chosen on behalf of the client thread to call B's method. When the call to object B is done the server thread is either discarded or returned to a pool for reuse, the result is then passed back to the client side, and the client thread is resumed with the result.

Thus, when A calls a remote B there is a transition of execution flow from the client thread to the server thread then back to the client thread. The client and server threads together perform what a single thread does in a non-remote "A calls B" scenerio.

The client object-server object interactions described above form the basis for the distributed object system. Different protocols have been proposed to facilitate these interactions. Unfortunately, many distributed object system protocols do not provide for seamless distributed computing to objects in applications that were not specifically designed to operate in a distributed environment. In particular, distributed system protocols may not take into account the need for particular thread assignment procedures.

In particular, current distributed system protocols assign server threads randomly from a pool of available threads. For example, a call from a client object to a remote server object may be performed by a thread (1). A later call from the client object to the server object may be performed by a thread (2). This randomness of thread assignment can lead to problems where the server application expects certain operations to be performed by the same thread. For example, a database application may require the same thread that opened the database to perform any action on the database. This restriction can help prevent security breaches into the system. However, this same restriction makes the database inaccessible through the distributed system.

Without a method and apparatus to provide consistent thread assignment in a distributed object system, interaction between remote distributed objects will not be possible in all types of applications.

DISCLOSURE OF INVENTION

According to the present invention, a method and apparatus for managing threads between client objects and server objects in a distributed object system is provided. The method and apparatus provide a distributed thread that associates dedicated service threads with a distributed thread identification for each transaction. By associating a dedicated service thread with a distributed thread identification it can be assured that all portions of a transaction are performed by the same thread. Thus, the present invention assures consistent thread allocation in a distributed system.

DESCRIPTION OF THE PREFERRED EMBODIMENTS

Figure 1:
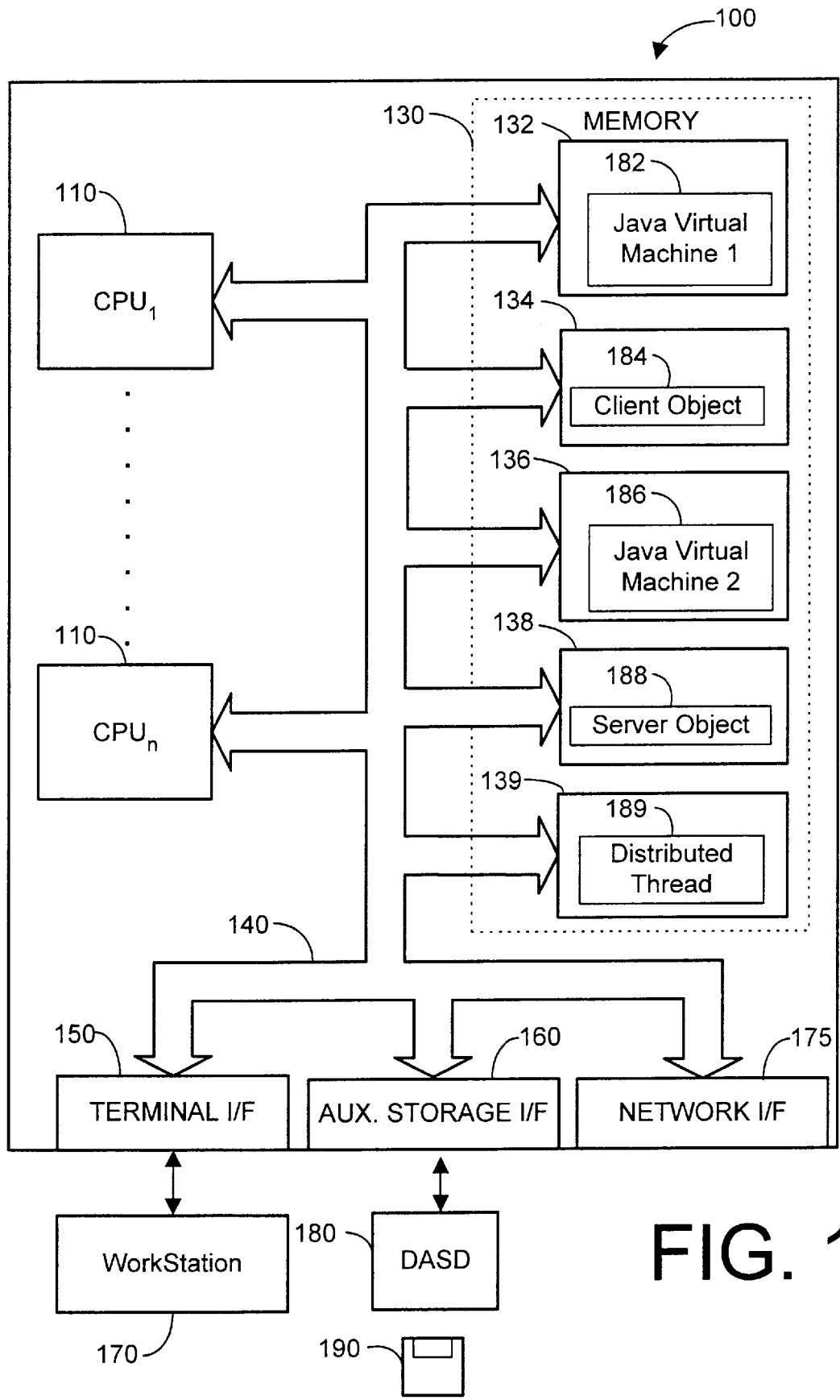
FIG. 1 is a schematic view of a distributed system in accordance with the preferred embodiment.

A method and apparatus for providing access between remote objects is provided. The method and apparatus provide a distributed thread that allows remote server objects to be accessed by client objects while maintaining consistent thread assignment. The method and apparatus can be used to facilitate distributed object interactions in systems that were not specifically to work in the distributed environment. In particular, the method and apparatus are applicable to accessing remote Java objects using a distributed object systems such as Sun Microsystems's Remote Method Invocation. An overview of Object-Oriented Technology, the Java Programming Language, and Thread Allocation will now be provided.

Overview—Object-Oriented Technology

Object oriented programming based on an object model is a new way of programming computer programs that has become very popular over the past several years. Computer programs written in object-oriented languages are known as object-oriented programs. Object-oriented programming differs from standard procedural programming in that it uses objects, not procedures, as its fundamental building blocks. This difference stems from the fact that the design focus of object-oriented programming technology is wholly different than that of procedural programming technology. The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects.

Conceptually, an object has two parts, an external object interface and internal object data. Internal data is encapsulated by the object interface such that other objects must communicate with that object through its interface. Thus, the only way to retrieve, process or otherwise operate on the encapsulated data is through methods defined on the object. This protects the internal portion of the object from outside tampering. Additionally, because outside objects have no access to the internal implementation, that internal implementation can change without affecting other aspects of the program. The object system thus isolates the requestor of services (clients) from the providers of services by a well defined encapsulating interface.

Data in an object is operated upon by calling "methods" on the object. In the object model, a client object sends a call to the server object system. The call identifies a particular object and specifies what method is to be performed by the object, and provides any parameters required. The object interprets the message to decide what service to perform, and returns back any data that results.

Because all operations on an object are expressed as calls from one object to another, methods can be called by remote objects. Objects that reside in different locations that communicate with each other across a network are called distributed objects in a distributed object system.

Another central concept in object-oriented programming is the class. A class is a template that defines a type of object. A class is defined by a set of class parameter that specify the details of objects that belong to its class. By defining a class, objects can be created that belong to the class without having to rewrite the entire definition. This promotes the reusability of existing definitions and promotes efficient use of program code.

There are many computer languages that support object-oriented programming. For example, Smalltalk, Object Pascal, C++ and Java are all programming languages that to one degree or another support object-oriented programming. Any of these and others can be used to write programs that use objects.

Several standards exist to provide for the sharing of objects across various types of networks, operating systems and hardware platforms. These standards lower the cost of developing distributed object computing systems. One such standard is the Common Object Request Broker Architecture (CORBA) specification as established by the Object Management Group is an OMG specification designed to provide for the sharing of objects across a wide variety of hardware platforms and operating systems. Applications that conform to the CORBA specification can communicate with one another regardless of location or vendor. In particular, CORBA defines interoperability by specifying the design of Object Request Brokers (ORBs) such that ORBs from different vendors can interoperate. This is done by defining ORB interfaces in a language-independent specification.

An ORB is a program that establishes client-server relationships between objects. ORBs provide the infrastructure that allows objects to converse, independent of the specific platforms and techniques used to implement the objects. Using an ORB, a client can transparently invoke a method on a server object, which can be on the same machine or across a network. The ORB operates by intercepting method calls and finding an object that can implement the request, passing the request parameters to the object, invoking the method, and returning the results. While doing so, the client does not have to be aware of where the object is located, its programming language, its operating system and any other system aspects. Thus, the ORB provides interoperability between applications on different machines in heterogeneous distributed object environments and seamlessly interconnects multiple object systems.

CORBA uses the concept of a proxy object to facilitate communication between distributed objects. A proxy object is an object of a proxy class that has the same methods as a particular real object, except that each method on the proxy object does nothing other than forward the method request through an ORB and across the network to the real object. A proxy object thus has the same interface as the real object (i.e., the methods that can be performed on the object) but has a different implementation (i.e, instead of performing the method, the method request is passed to the real object.)

Overview—Java

Java is a modern object oriented programming language specially designed to create distributed object systems. Java offers many features and advantages that makes it a desirable programming language to use. First, Java is specifically designed to create small programs, commonly called applets, that can reside on the network in centralized servers, and delivered to the client machine only when needed. Second, Java is completely platform independent. A Java program can be written once and run on any type of platform that contains a Java Virtual Machine (JVM). And third, Java is an object oriented language, meaning that software written in Java can take advantage of the benefits of object oriented programming.

As in other object oriented systems, operations are performed by an object calling a method on another object. These objects can reside locally on the same machine or on separate JVM's on separate computers (Java objects on separate JVM's are called remote objects). This remote object interaction can be done using ORB's, as discussed above, or it can be done using the Java Remote Method Invocation (RMI) standard.

The Java RMI standard provides a system that has been specifically designed to facilitate distributed object interaction for Java Objects. The Java RMI, as it is designed for only Java objects, can provide seamless integration between Java Objects by taking advantage of the Java object model whenever possible. The Java RMI is designed to support seamless remote invocation of objects on different machines, and thus make the creation of reliable distributed applications as simple as possible.

The RMI system comprises three layers: 1) a stub/skeleton layer, 2) a remote reference layer, and 3) a transport layer. The stub/skeleton layer comprises client-side proxy objects (called stubs) and server-side objects called skeletons. A client-side stub object implements all the interfaces that are supported by the real server object. Calls made by the client object to the server object are received by the stub object, which initiates the call to the server object by calling the remote reference layer, and delivering the arguments to the remote reference layer. The remote reference layer delivers the call and the arguments to the server-side skeleton through the transport layer. The skeleton contains a method which dispatches the call to the actual server object. The skeleton will then receive and pass any return value (or exception) back to stub, where it will be delivered to the client object.

For more information on Java RMI, see the Java Remote Method Invocation Specification, published by Sun Microsystems.

Overview—Thread Allocation in Distributed Object Systems

The actions performed by modem computer programs are typically broken into sub-groups, called processes or tasks. Each process, when run by the program, is assigned its own set of resources. For example, each process is assigned its own address space in which to operate. Thus, multiple processes running at one time will not overrun each other's address space, and the multiple processes can operate concurrently without conflicts in resources.

Each process can include one or more "threads." Threads are a type of "mini-process" that shares the address space of their parent process. Because the threads share the resources of the parent process, multiple threads can be spun off at one time without requiring excessive memory resources. For these reasons, a thread is often described as a "light process."

Threads have been used to improve the performance of application software systems by using "multi-threaded" programming concepts. In multi-threaded computer programming environments, each process will have multiple threads, and each thread can be processed to completion independently. By assigning multiple threads to complete process, and allowing these threads to be processed simultaneously, the process can be completed in a more expeditious fashion than in a single threaded system.

As stated before, object-oriented programming uses objects that interact with each other through method calls.

These method calls are implemented by threads. For example, for an object A to interact with an object B, a thread first gets object A. While running within A's method the thread then gets object B and calls one of B's method. Thus, all parts of the interaction are performed by the same thread. This interaction is referred to as "A calls B."

In distributed object systems such as Java RMI the interaction between threads and objects is more complex. In these distributed systems a "client object" runs in a client thread on the client system and calls methods on a "server object" which runs in a server thread on a server system.

In particular, making a call from an object A to an object B (where B is on remote machine) involves a client thread "getting" object A, and then "invoking" A's method to call object B (where "getting" an object comprises obtaining a pointer to the object and "invoking" comprises allocating a stack frame to run the object's method). To call object B in a CORBA or Java RMI system, the client thread must first get a proxy object (or stub) for object B.

After getting the proxy, the client thread then invokes the same method on the proxy as if it was calling the method on the real object B. The code of the proxy's method, running in the client thread, delivers the call and all parameters to the real object B through the infrastructure (e.g. transport layer) of the distributed object system. The client thread then waits for the return (with or without return value) of the remote call.

On the server side the distributed system typically has a randomly assigned server thread listening to the network connection for remote call requests. When this server thread receives the call, it extracts all the data passed from the client side. From this data, the server thread gets the requested real object, and invokes the requested method on it. Note that in the Java RMI system the server thread actually gets a skeleton object for the real object, that skeleton object then finds the real object and invokes the requested method on it. When the method is done, the server thread passes any return value back to the client side. Note again that all these are done within the server thread.

Thus, all the activity of the server side is done within the server thread. Current distributed system protocols, such as Java RMI, assign server threads randomly from a pool of available threads. There are several different circumstances in which the random allocation of threads in a distributed system can be problem.

One problem is when multiple calls from one client object to one server object are performed by different server threads, and where the server object assumes that they will be performed by the same server thread. For example, a transaction could comprise a client object and performing a deposit in a bank account server object. This transaction could comprise four method calls between the client object and the server object, i.e., a call to open the database, a call to make the deposit, a call to commit the deposit to the database, and a call close the database. Using a system such as Java RMI, the first call to open the database is randomly assigned an available server thread, (e.g., thread (1)), and the second call to make the deposit is randomly assigned an available server thread (e.g., thread (2)). There is no guarantee that these two methods will be performed by the same thread.

This can be a problem where the server object expects these actions to be performed by the same thread. Many applications have been designed to require subsequent actions be performed by the same thread as a security precaution (i.e., to prevent authorized access). In these server applications the program ties the opening of the database to the thread that opened it, and when the second call comes to deposit on the database the program checks to see if it is from the same thread. For a remote call to work with this type of application it must be guaranteed that all calls to the server object are serviced by the same server thread. Thus, a distributed object system such as Java RMI is currently incompatible with a server application that expects all access for a particular transaction to be performed by the same thread.

A second type of problem is where an application has been designed to work with a single thread, not for security purposes, but simply because it was not foreseen that the application would be used in a distributed environment. In these cases the random assignment of threads can lead to crashes and other problems such as a lockup. For example, assume an object A calls a method on object B, and to perform this method object B calls object C, which to perform its method must call back to object A. This is a "callback" and is a familiar occurrence in many application programs.

In a single thread system the callback from A to B to C then to A all run within the same thread, so it has no problems to access any locked resources (such as monitors in Java) owned by object A. If we now extend this callback to a distributed algorithm then there will be four threads involved to complete this callback. Thread (1) is the client thread of "A calls B". Thread (2) is the server thread of "A calls B" and the client thread of "B calls C". Similarly, thread (3) is the server and client thread of "B calls C" and "C calls A" respectively. And thread (4) is simply the server thread of "C calls A". Note that threads (1) and (4) both run A's method code and reside in the same machine (e.g., the same JVM). This can lead to deadlock. Deadlock occurs where resources needed to perform an action are locked by other operations and cannot be used.

For example, deadlock can occur if thread(4) tries to access any locked resources already owned by thread (1). The deadlock is due to thread (4) waiting for thread (1) while thread (1) is waiting for the return of "A calls B," (which cannot be returned until the return of "B calls C" and "C calls A") before it can release the locked resource. Since thread (1) is waiting for thread (4), we have a deadlock and the program can proceed no further.

A third problem in most distributed object systems occurs during a remote call when the client thread making the call is not available to interact with other threads. For example, after making "A calls B" the client thread (1) is blocked to wait for the return of that call and can not do anything else. Thus, there is no way that thread (1) can service a call such as "D calls A" except to create different thread for the callback. This has the same impact as the first problem to applications such as transactions which require the callbacks to be serviced by the same thread.

Thus, for many types of remote calls to work it must be assured that the same thread will be available and assigned to handle multiple requests. The remainder of this specification discloses an apparatus and method for assuring the proper allocation of threads in a distributed object system.

DETAILED DESCRIPTION

Figure 2:
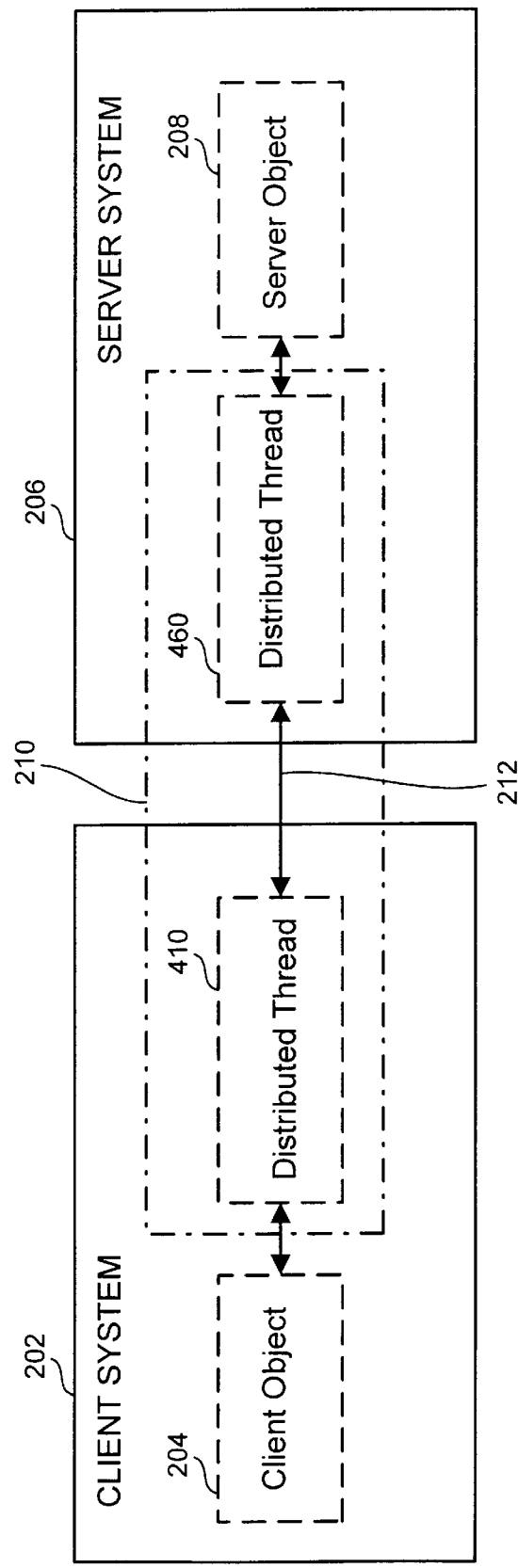
FIGS. 2 and 3 are functional block diagrams illustrating a distributed system using distributed threads in accordance with the preferred embodiment.

Referring now to FIG. 2, a client system 202 and a server system 206 are shown to illustrate an embodiment of the present invention. The client system 202 is connected to the server system 206 over network connection 212. The network connection 212 can be any network mechanism, such as a local area network (LAN), a wide-area-network (WAN), an intranet connection, or an Internet connection allowing the client system 202 to communicate with the server system 206.

The client system 202 can be any suitable client system, such as an IBM compatible personal computer. The client system 202 includes a client object 204. The client object 204 is any software object, but is preferably a Java object. The server system 206 includes a server object 208.

The terms client object and server object refer to the fact that the client object calls a method on the server object, and the server object performs the method. An object can be a client object at one moment when it makes a method call to another object and a server object the next moment when it receives a method call. Thus, the client object 204 can be any object making a call and the server object 208 can be any object receiving the method call. Because the client object 204 and the server object 208 are on different systems, they are referred to as remote from one another. Thus a call from the client object 204 to the server object 208 is a remote method call. Where the client object 204 and server object 208 are both Java objects, they are preferably remote in the sense that the client object resides on one Java Virtual Machine (JVM) and the server object resides on a different JVM.

Because the objects are remote, a distributed object system is needed to facilitate interaction between objects. This distributed object system can comprise any system, such as CORBA, but preferably comprises the Java Remote Method Invocation (RMI) system. The Java RMI provides the environment for the remote Java objects to communicate.

In accordance with the preferred embodiment, a logical thread system 210 is used to facilitate remote interaction while maintaining consistent thread allocation. The logical thread system 210 is comprised of a distributed thread 410 on the client system 202 and a distributed thread 460 on the server system 206.

When the client object 204 makes a call to the remote server object 208, the logical thread system 210 assures that the appropriate thread is used for each part of the transaction.

Referring now to FIG. 1, a computer system 100 in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a bus 140; and a memory 130 which includes multiple locations for containing various software programs. In this example, memory 130 includes a Java Virtual Machine 1 182 running in location 138, a client object 184 residing in location 134, a Java Virtual Machine 2 186 running in location 136, a server object 138 residing in location 188, and an distributed thread 189 running in location 139.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and CPUs 110 may be distributed across several different computer that collectively comprise system 100. For example, Java Virtual Machine 1 182 may reside on one computer with CPU$_1$ and Java Virtual Machine 2 186 may reside on another computer system with a separate CPU$_2$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and materials for connecting computer systems and components will be readily adapted for use with the present invention. This would include those methods and materials not presently known but developed in the future.

Terminal interface 150 allows human users to communicate with system 100, normally through a workstation 170. Workstation 170 is preferably a computer system such as an IBM PS/2 personal computer, RS/6000 or an AS-400 computer. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk. DASD 180 may also be any other type of DASD known to those skilled in the art. This would include CD-ROM drives, hard disk drives, optical drives, etc.

Network interface 175 is used to connect other computer systems and/or workstations to computer system 100 in networked fashion. In the preferred embodiment the network interface 175 provides a connection to the Internet and the World-Wide-Web, but could also be to connect to other networked environments, such as internal web-based systems (typically called Intranets). The present invention applies equally no matter how computer system 100 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks 190, CD-ROMs and transmission type media such as digital and analog communication links.

Figure 3:
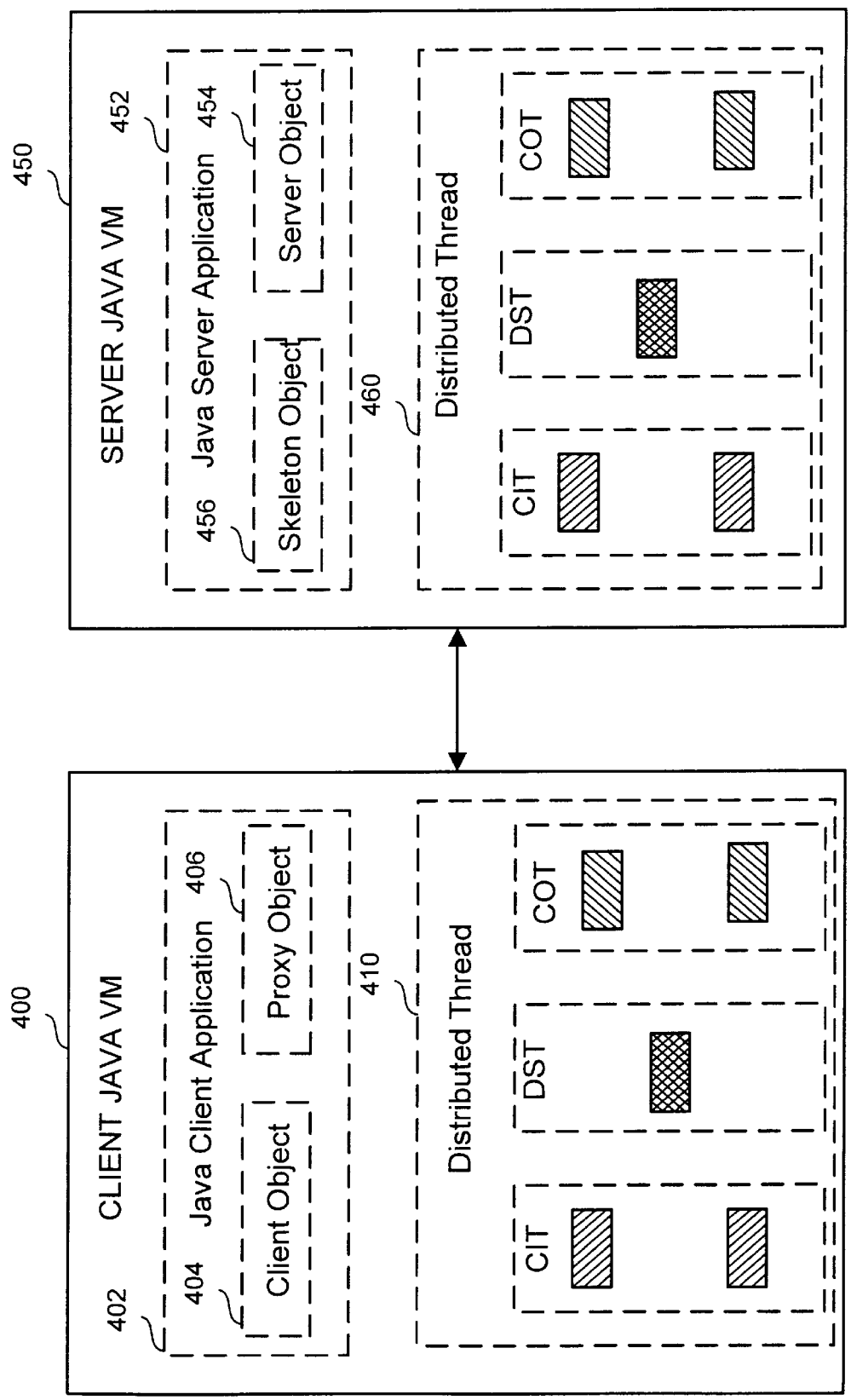

Referring now to FIG. 3, a client JVM 400 and a server JVM 450 are illustrated as functional blocks to better illustrate the preferred embodiment of the present invention. Inside client JVM 400 is a Java Client Application 402, which includes at least one client object 404. Inside the server JVM 450 is a Java Server Application 452, which includes a server object 454. In accordance with the Java RMI system, a proxy object 406 of the server object 454 is created on the client side, and a skeleton object 456 of the server object 454 is created on the server side.

In accordance with the preferred embodiments, a logical thread system comprising distributed threads are used as a thread assignment mechanism to assure consistent thread allocation during a transaction, where the transaction includes a plurality of related calls between remote objects. In particular, a distributed thread 410 is included in the client JVM 400 and a distributed thread 460 is included in the server JVM 450. The distributed threads 410 and 460 which span different JVMs can function together as a single logical thread which will route method calls from objects to an appropriate thread. While a normal thread in the prior art runs local calls on a single computer, the logical thread can run from one computer first and make remote calls to other computers in a chain or loops.

Each distributed thread 410 and 460 is preferably implemented as a distributed thread context object. The distributed thread context object contains the runtime state data related to the distributed thread and the real threads associated with it. The distributed thread context object does not perform the actions themselves, instead it serves to control the assignment of real threads which perform various actions in the method.

In the preferred embodiment, each distributed thread uses three types of threads to perform its thread allocation. In particular, each distributed thread includes a dedicated service thread (DST) and will also include communication-in threads (CIT) and communication-out threads (COT) as needed. In FIG. 3, the dedicated service threads are illustrated as cross-hatched boxes in the DST column, communication-in threads are illustrated as hatched boxes in the CIT column, and communication-out threads are illustrated as hatched boxes in the COT column.

Dedicated service threads are the "real threads" assigned by the distributed thread to perform the actions that are performed by client threads and server threads in the prior art systems. For example, dedicated service threads get objects, invoke methods on objects, get and make calls to proxy objects, skeleton objects, and server objects, and returns any values. The dedicated service threads perform the actions that the prior art threads performed but instead of being selected randomly from a pool of available threads, the dedicated service thread is assigned and allocated by the distributed thread. In the preferred embodiment a dedicated service thread exists on both the client side and the server side, although the client thread could be a normal thread in some circumstances.

Communication-in threads are threads that receive method calls from clients or other JVMs, and pass the method call to the appropriate service thread to be performed. These threads behave similar to communication threads in distributed object systems such as Java RMI in that they are randomly assigned to receive remote method calls. In accordance with the preferred embodiment however, the communication-in threads pass the method call to the appropriate dedicated service thread, and not just a random thread as in the Java RMI system.

Communication-out threads are threads that wit for reply of remote calls from a remote server object in another JVM. These threads are preferably used whenever a object makes a remote call out to another object.

In the preferred embodiment, a distributed thread is created when the first remote call is made from a client object to a server object. This distributed thread can then be used for any subsequent related calls (for example, calls belonging to the same transaction) between the client object and the server object. When the distributed thread is created, a unique distributed thread identification (DT ID) is assigned to that distributed thread. The DT ID uniquely identifies this distributed thread from all other distributed threads created in the network. The DT ID will be used to direct future method calls to the appropriate service thread which will then perform the method call. The DT ID could comprise a combination of the machine name that created it, along with a time stamp of the creation time. Using this procedure assures that no other distributed thread in the network will have the same DT ID. Some systems have the ability to make these type of unique identifiers. For example, the DT ID can be created according to Universal Unique Identifier (UUID) standard as set forth in CORBA.

Figure 4:
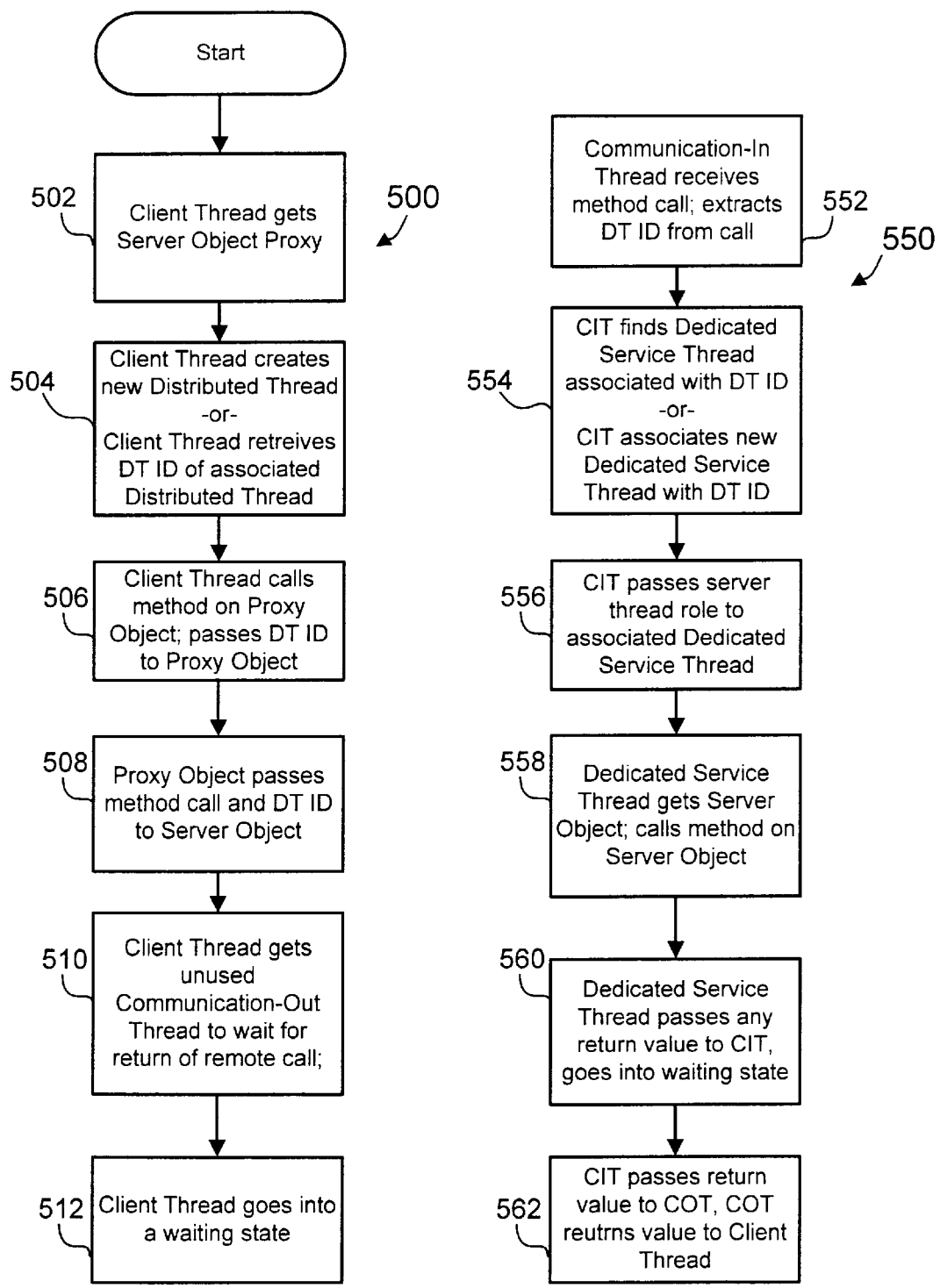
FIG. 4 is a flow diagram illustrating the method for maintaining consistent thread allocation in a distributed system.

Turning to FIG. 4, a method 500 for making a remote method call from a local client object and a method 550 for a remote server object receiving a method call using logical distributed threads is illustrated. Preferably, a client object is running in a client thread, when the client object makes a call to a remote server object. It should be noted that the client thread is a client thread in the normal sense that the client object runs within it, but client thread could also be a dedicated service thread. In particular, the creation of a distributed thread and the association of a dedicated service thread, which then performs the functions of the client thread by running the client object, could have been previously performed (e.g., when the transaction was first started, or when a previous remote call was made).

It should also be noted that while the term "client thread" is used to distinguish the thread running on the client side, the client thread actually plays two roles during operation. For example, when a remote call is made from the client object the client thread behaves as a regular client thread. Immediately after making the remote call the client thread enters into a waiting state to receive any callback and thus performs the function of a server thread. Conversely, a "server thread" runs the server object, but when the server object makes a new call it performs the function and behaves like a "client thread." This dual personalites of threads is a common feature in distributed systems.

When the client object makes a call to a remote server object the first step 502 is for the client thread to get a proxy object for the server object. The proxy object (called a stub in the Java RMI system) has the same interface as the real object (i.e., the methods that can be performed on the object) but has a different implementation (i.e., instead of performing the method, the method request is passed to the server object.) It should be noted that the client thread "getting" the proxy object comprises obtaining a pointer to the object.

With the proxy object obtained, the next step 504 is for the client thread to create a new distributed thread, or if a distributed thread has already been created for this transaction to retrieve the distributed thread identification (DT ID) for this distributed thread. If a distributed thread has already been created for this transaction, that same distributed thread (i.e., the same DT ID and the service threads already associated with that DT ID) will be used for later calls, and no new distributed thread will need to be created.

If no distributed thread has been previously created, the client thread creates a unique DT ID which will be used to associate the threads that are part of this transaction. In particular, the DT ID is associated with this client thread such that calls made back to the client object can be passed to and handled by the same client thread. By associating the client thread with a DT ID, the client thread becomes a dedicated service thread for handling interactions on the client side which are part of this transaction.

The preferred method of creating a distributed thread is to create a distributed thread context object. The distributed thread context object is not areal thread in the technical sense, but an object used to associate real threads with a particular transaction, and to pass calls to the correct real thread, and thus the distributed thread context object works as a type of logical thread.

The next step 506 is for the client thread to invoke the method requested by the client object on the proxy object, and to pass the DT ID for this transaction to the proxy object. Invoking a method on the proxy object comprises allocating a stack frame for the proxy object's method, and then running the method. As part of the proxy object implementation, the next step 508 is for the proxy object to pass the method call and the DT ID to the server object. This is done using the distributed object system. Thus, in a CORBA system the method call and DT ID are passed to the server object using a Object Request Broker. Likewise, in a Java RMI system, the method call and DT ID are passed to the server object using the remote reference layer, the transport layer and a skeleton object for the server object. In either case, the basic action is performed by the client thread and will be received by a Communication-In thread on the server side.

Figure 5:
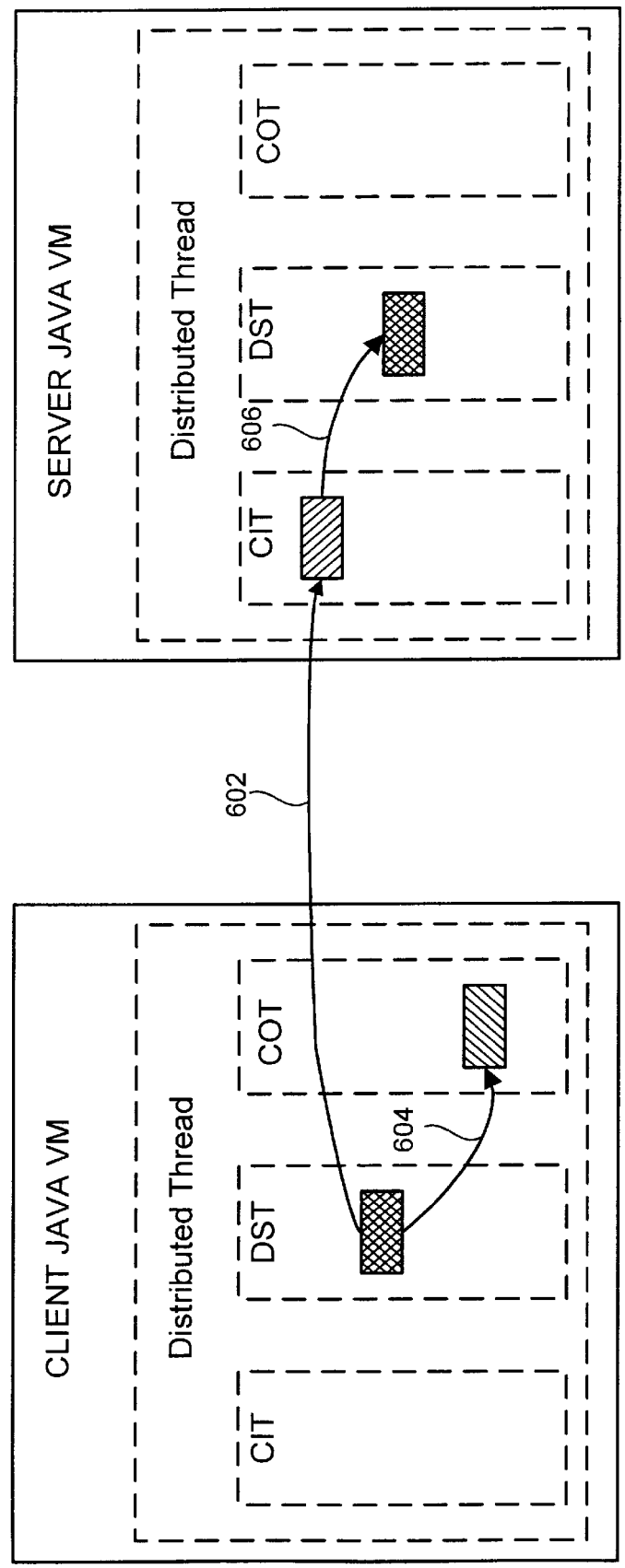
FIGS. 5–9 are functional diagrams illustrating remote method calls using the preferred embodiment distributed thread system.

Turning to FIG. 5, a schematic diagram showing interaction between distributed threads elements is illustrated. Line 602 illustrates the communication between the proxy object in the client thread (in the illustrated case a DST on the client side) and the Communication-In thread that occurs in steps 506.

Returning to the method 500 of FIG. 4, with the method call and DT ID sent by the client thread, the next step 510 is for the client thread to get an unused Communication-Out thread (COT). The COT is used to wait for any return value that comes as a result of the remote call. With the COT waiting to receive the return value, the client thread is free to put itself in a waiting state. The next step 512 is for the client thread to go into a waiting state such that it can receive any new remote calls, such as a call back to the client object from any other remote object. As will be further discussed, this solves the problem of the client object being locked out such that a call back cannot be performed.

Returning to FIG. 5, the step 510 of client thread getting an unused Communication-Out thread is illustrated by line 604.

At this point, the method call, along with the DT ID has been passed to the server side, the COT remains on the client side waiting for any return value, and the client thread is in waiting state such that it can perform any call back. The method 550 includes the preferred steps on the server side of the remote transaction.

The first step 552 is for a Communication-In thread on the server machine to receive the method call and DT ID. Preferably the distributed system infrastructure will have a Communication-In thread (CIT) listening to the network connection at all times for remote call requests. When the CIT receives the request, it extracts all the data passed from the client side. Included in this data will be the DT ID and the method call and its associated data.

The next step 554 is for the CIT to locate the Dedicated Service Thread (DST) associated with this transaction using the DT ID. If no DST has been associated with this DT ID before, an association is made between the DT ID and a new DST (where the new DST can be either a entirely new DST or one unused DST recycled from a pool of threads).

The next step 556 is for the CIT to pass the method call to the associated Dedicated Service Thread. The associated DST assumes the role of the server thread while the CIT waits for the DST to complete the remote call and return any value. Thus, the role of the CIT is to receive incoming method calls, extract the DT ID, and pass the method call to the appropriate DST.

The Dedicated Service Thread is initially in a state of waiting for a remote call request from a CIT or a reply from a COT. This waiting state is preferably the same waiting state which the client thread goes into in step 512 after making the remote call. Thus, when it receives the method call from the CIT it can perform the requested actions. The passing of the method call from the CIT to the waiting Dedicated Service Thread is illustrated by line 606 in FIG. 5.

After the DST receives the method call, the next step 558 is for the DST to get the server object and invoke the requested method on the server object. In the Java RMI system, this actually involves getting a skeleton object for the server object, and using the skeleton object to get the server object and pass and invoke the method in the server object. In both cases, all the actions and any return value are handled by the DST.

The next step 560 is for the DST to pass any return value it receives from the server object back to the CIT and then for the DST to go back into the waiting state. This allows the DST to be available to receive any new remote calls, such as a call back to the server object from any other remote object.

The next step 562 is for the CIT to pass the return value back to the waiting COT, and from there passed back to the client thread.

Figure 6:
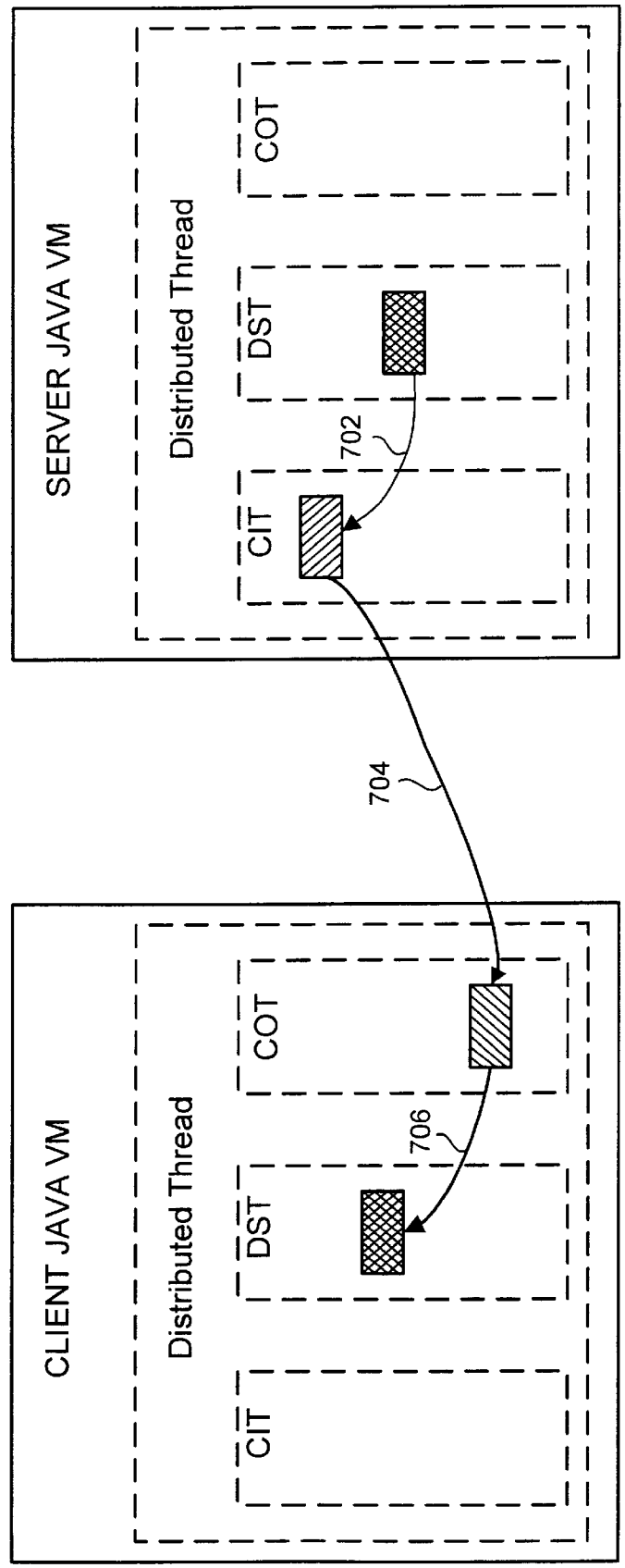

Turning to FIG. 6, a schematic diagram is shown illustrating the return of values to the client thread. The server object will pass any return values to the server side dedicated service thread. The dedicated service thread will then pass those values to the CIT, as illustrated by line 702. The CIT will then pass the values back to the COT waiting on the client JVM as illustrated by line 704. The COT will then pass the values to the appropriate client side dedicated service thread, as illustrated by line 706.

When a transaction is completed there are several options. First, the client thread can be disassociated from the distributed thread, and the distributed thread destroyed. In a second alternative, the client thread can be disassociated from the distributed thread, but the distributed kept for later reuse. In a third alternative, the client thread can remain associated with the distributed thread.

The first alternative is easy to manage but can require a lot of resources to implement as every transaction will need a new distributed thread with a new DT ID and association with DST's. In the second alternative, the distributed thread remains available so later transactions can use it again. When the later transaction starts the new client thread that processes the transaction will need to be associated with the distributed thread first. Note that in this case the same DST on the server side that processed the first transaction will be used again for the second transaction because the DT ID is the same. This should not be a problem since the DST preferably returns to the initial state when the previous transaction ends. In the third alternative no management is required but the client thread remains tied to the same DT even if it does not need to use the DT any more. This can cause problems in an environment with limited resources.

Many problems can occur if a client thread is disassociated from its DT in the middle of a transaction and lets another client thread associate with that DT. Thus, in the preferred embodiment it is ensured that this will not occur.

Figure 7:
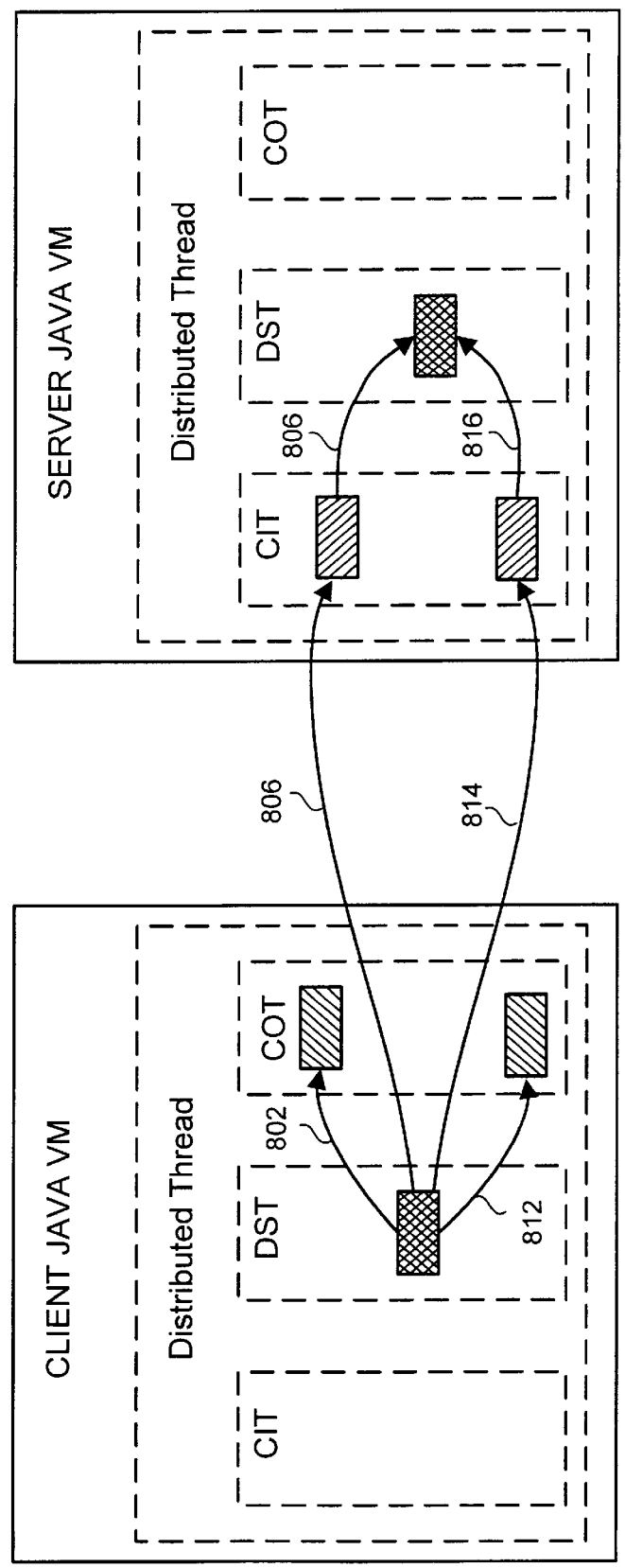

The advantages of using distributed threads are best seen when applied to multiple calls or multiple call back situations. For example, turning to FIG. 7 a block diagram illustrates how two remote calls as part of the one transaction can made from the same client dedicated service thread, processed by two different CITs, and then be processed by the same server service thread. This transaction is the same as discussed before. Namely, the client object makes a remote call to a proxy of the server object, with both the client object and the proxy object residing in the client dedicated service thread. The call is passed by the proxy object, along with the DT ID to any CIT on the server side as illustrated by line 806. As in the case illustrated in FIG. 6, when the client service thread passes the method call to a CIT, it next gets a COT to wait for any reply back, as illustrated by line 802. The client thread can then go into a waiting state such that it can perform any later operation.

On the server side, the CIT receives the remote method call and extracts the DT ID. The CIT will then locate the DST associated with this DT ID and pass the call on to that DST, as illustrated by line 806. If no such DST has been associated, the CIT will get a new DST and make the association before passing the method call on. In either case, the DST is in a waiting state such that it can receive remote call requests from a CIT or a reply from a COT. The DST can then get the appropriate server object, make the requested method call on the server object, and pass any return value back through the CIT and the COT to the original client thread (as was illustrated in FIG. 6) After doing so, the server side DST can return to the waiting state.

Assume now that a second call is made by the client object to the remote server object. The client object, which still resides in the client dedicated service thread, makes the remote call to the server object proxy also still resides in the dedicated service thread. The second call is passed by the proxy object, along with the DT ID to any CIT on the server side as illustrated by line 814. When the client service thread passes the method call to a CIT, it next gets a COT to wait for any reply back, as illustrated by line 812. It does not matter what COT performs this task and thus the COT can be randomly chosen. Once again, the client dedicated service thread can go into a waiting state.

On the server side, a CIT receives the remote method call and extracts the DT ID. The CIT will recognize the DT ID as associated with the same dedicated service thread as the previous call, and will pass the method request to that dedicated service thread, as illustrated by line 816. Again, the server dedicated service thread is in a waiting state such that it can receive remote call requests from a CIT or a reply from a COT. The dedicated service thread can then get the appropriate server object, make the requested method call on the server object, and pass any return value back through the CIT and the COT to the original client thread.

Thus, both calls to the server object from the client object are made by the same server dedicated service thread, even though they were passed through different communication threads. This overcomes the problem discussed above where an application expects subsequent calls to come from the same service thread, but the standard distributed object system allocates the service threads randomly.

In the example discussed above, the first call could comprise a call to open a database, and the second call could comprise a call to deposit in the database. Because both calls will be ultimately made on the server object by the same service thread, the application will accept the second call and perform the action.

Figure 8:
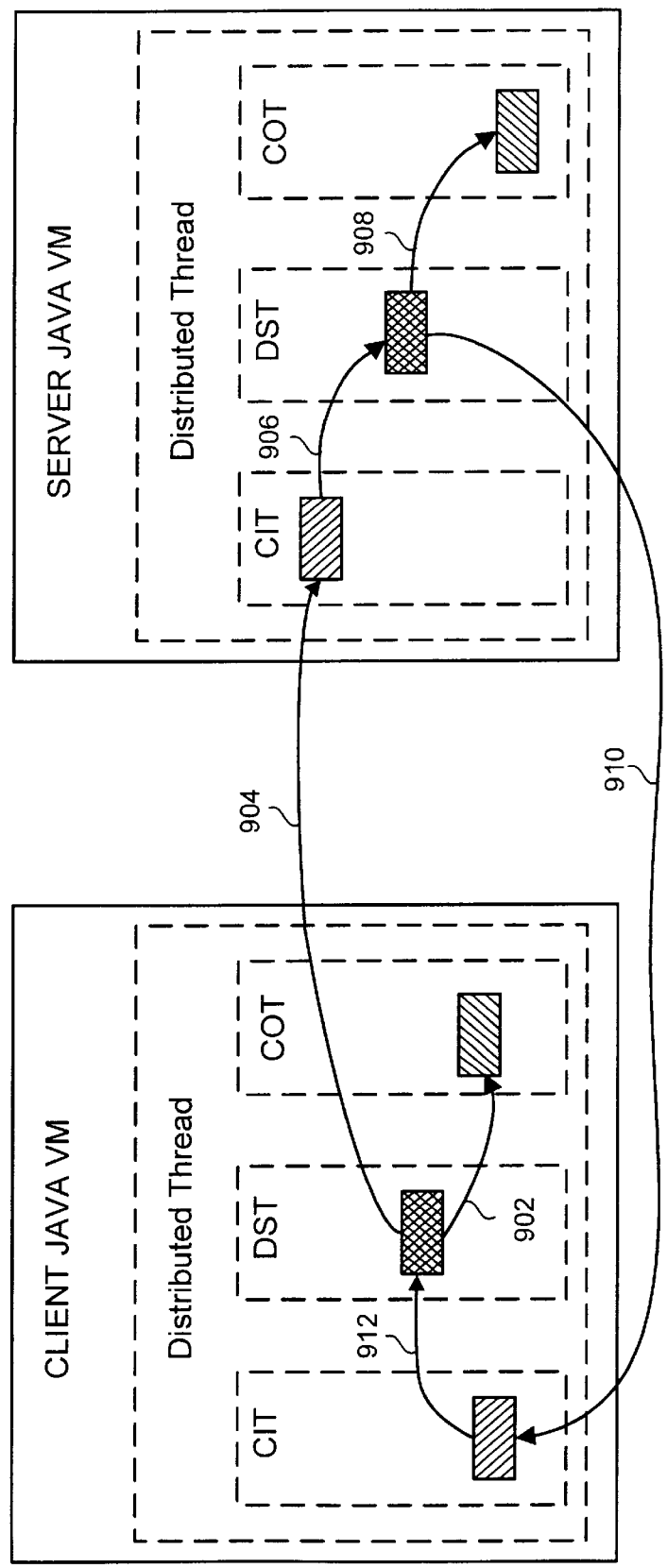

Turning now to FIG. 8, a block diagram illustrates how the preferred embodiment distributed thread system can be used to handle a call back situation. A call back is where a call from the "server" JVM must be made back to the "client" JVM to complete the original method call. As discussed above, when the client side service thread makes a call, it puts itself in a state to receive either remote call requests from other JVMs or returned values from the called server object. Thus, where a method call requires a call back, it can receive a call from the server object.

In the illustrated example, a call was made by the client object residing in a client DST, passed by the proxy object along with the DT ID to CIT on the server side as illustrated by line 904. The client DST then gets a random COT to wait for any reply, as illustrated by line 902. The client DST then goes into a waiting state. The CIT receives the remote method call and extracts the DT ID, and passes the call on to the appropriate DST, as illustrated by line 906. The DST can then get the appropriate server object, and make the requested method call on the server object.

In this case, to perform the requested method, the server object must make a callback to an object on the client side. This object, which we will call a "callback object" can be the original client object or any other object on the original client side. For this interaction, the client side becomes the "server" and the server side becomes the to the "client." The original server DST first gets a proxy for the callback object, and makes the appropriate method call to the callback object proxy. The call is then passed by the callback object proxy to a CIT on the client side, as illustrated by line 910. The server DST can then get a COT to wait for any reply back, as illustrated by line 908 and then go into a waiting state.

A CIT on the original client side receives the call, extracts the DT ID from the call, and passes the call to the client side DST associated with the DT ID, as illustrated by line 912. This insures that the callback is performed by the same client side thread as the original method call. Thus, there will be no problem of resources being locked out such that the callback cannot be performed as occurred in the prior art.

Figure 9:
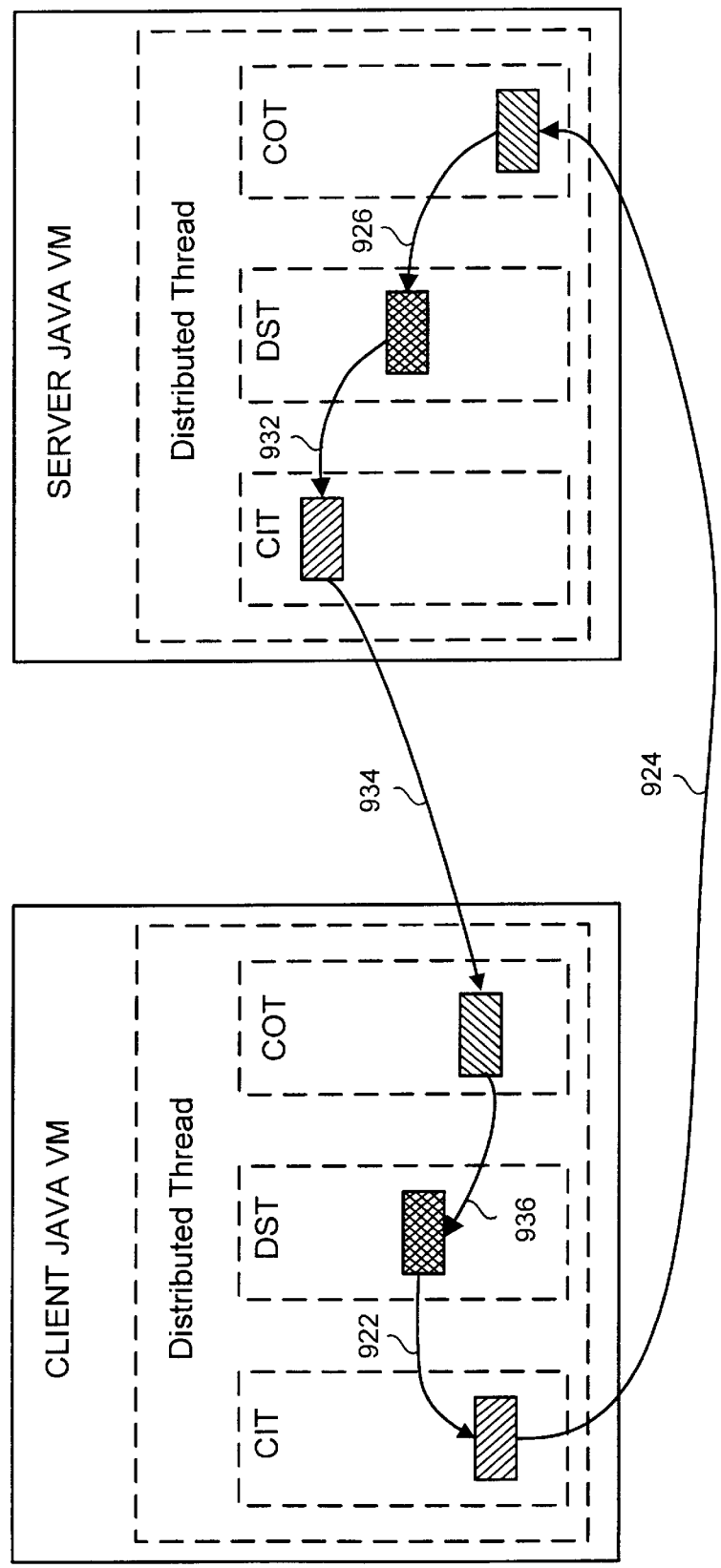

Turning to FIG. 9, any reply from the call back object is passed from the client side DST to the client side CIT (line 922), from the client side CIT to the waiting server side COT (line 924), from the server side COT to the original server DST (line 926). The original server object can then finish the called method and return any value back to the original client object by passing it from the server DST to the server CIT (line 932), from the server CIT to the waiting client side COT (line 934), and from the client COT to the original client DST (line 936).

Figure 10:
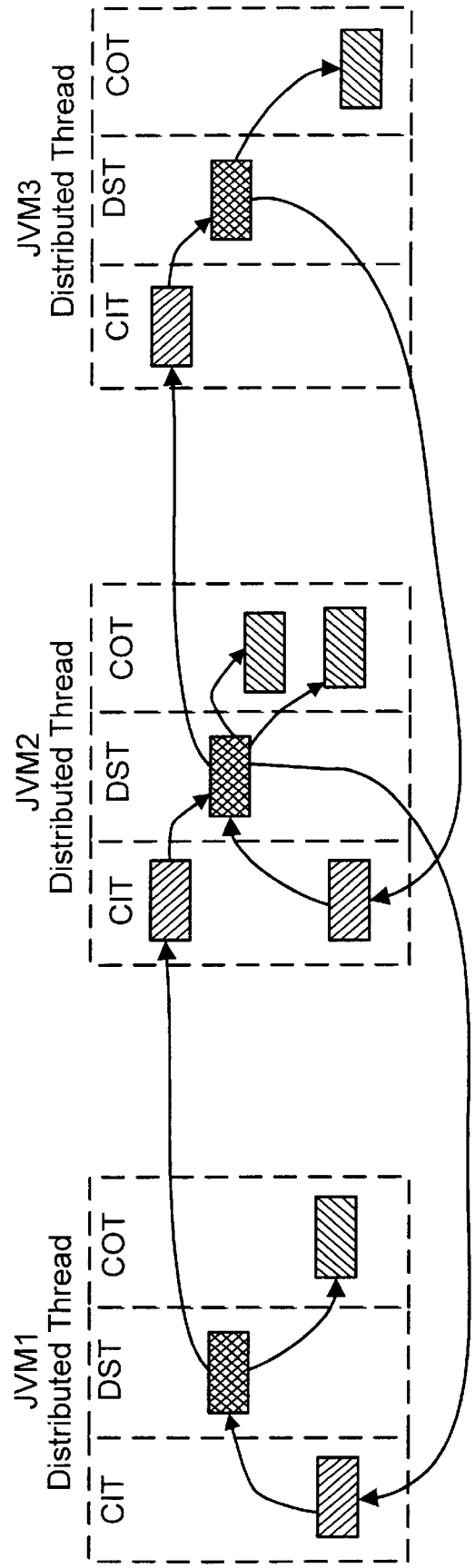
FIG. 10 is functional diagram illustrating a double call back situation using the preferred embodiment distributed thread system.

Turning now to FIG. 10, a block diagram illustrates how the preferred embodiment distributed thread system can be used to handle a double call back situation. In this example, a method call is made from an object in JVM1 to an object in JVM2. To perform the method call, the object in JVM2 makes a call to an object in JVM3. To perform its part of the method call, the object in JVM3 makes a call back to an object in JVM2, which then makes a second call back to an object in JVM1. The distributed thread system allows consistent thread allocation throughout this process. In particular, the DT ID for this process is passed to for each call back, and this allows the distributed thread to use the appropriate dedicated service thread that has already been allocated for this process. All the operations performed in JVM1 will thus be performed by the same dedicated service thread. Likewise, all the operations in JVM2 are performed by the same service thread, and all the operations in JVM3 are performed by the service thread. This assures that no resources will be locked out and prevent a call from completing.

Thus the preferred embodiment can be used to assure consistent thread assignment in a wide variety of circumstances, whether in a chain of remote calls (if there is no callback), or a loop of remote calls (if there is a callback), or a mix of both. In any case, all the remote calls are made and serviced by the same dedicated service thread.

The preferred embodiments can be used to extend normal single-thread algorithms to distributed multiple-thread systems without worrying about thread assignment indeterminacy. Thus, "local only" application can be made to operate in a distributed object system by replacing the local call by a remote call and using distributed threads to assure consistent thread assignment. Furthermore, the preferred embodiments allow nested or recursive remote calls to be made in a chain or a loop without race conditions or deadlocks by allowing the client thread to receive callbacks after making a remote call.

What is claimed is:

1. An apparatus comprising:
   at least one processor;
   a memory coupled to the at least one processor;
   a computer program residing in the memory, said computer program including a distributed thread mechanism, said distributed thread mechanism associating a first service thread with a distributed thread identification to allocate said first service thread to perform operations for a distributed transaction, said distributed thread mechanism passing said distributed thread identification with calls to a remote system in said distributed transaction, and wherein said distributed thread mechanism associates a second service thread on said remote system with said distributed thread identification to allocate said second service thread to perform operations for said distributed transaction on said remote system.

2. The apparatus of claim 1 wherein said distributed thread mechanism comprises a distributed thread context object.

3. The apparatus of claim 1 wherein said apparatus comprises in a Java virtual machine.

4. The apparatus of claim 1 wherein said distributed thread mechanism further includes at least one communication-in-thread that receives incoming remote calls, and wherein said at least one communication-in-thread parses said distributed thread identification from said incoming remote call and passes said remote call to said first service thread associated with said distributed thread identification.

5. The apparatus of claim 1 wherein said distributed thread mechanism further includes at least one communication-out-thread that receives any return values, and wherein said at least one communication-out-thread passes said returned to said first service thread.

6. A method for allocating threads in a distributed computing environment having a client system and a server system, the method comprising the steps of:
 a) creating a distributed thread identification;
 b) associating a first dedicated service thread on said client system with said distributed thread identification said association allocating said first dedicated service thread to a distributed transaction;
 c) passing said distributed thread identification from said client system to said server system when performing a remote call as part of said distributed transaction; and
 d) associating a second dedicated service thread on said server system with said distributed thread identification, said association allocating said second dedicated service thread to said distributed transaction.

7. The method of claim 6 wherein the step of passing said distributed thread identification comprises passing said distributed thread identification with a remote call from a client object on said client system to said server system.

8. The method of claim 6 wherein the step of passing said distributed thread identification from said client system to said server system comprises passing said distributed thread identification to a communication-in-thread on said server system.

9. The method of claim 6 wherein the step of passing said distributed thread identification from said client system to said server system comprises passing said distributed thread identification to a communication-in-thread on said server side, and wherein said communication-in-thread determines if said second dedicated service thread on the server system has been associated with said distributed thread identification.

10. The method of claim 9 wherein said communication-in-thread associates said second dedicated service thread on the server system with said distributed thread identification if said second dedicated service thread has not previously been associated with said distributed thread identification.

11. The method of claim 6 further comprising the step of assigning a communication-out-thread on said client side to receive any returned value from said server system.

12. A program product comprising:
 (A) a distributed thread mechanism, said distributed thread mechanism associating a dedicated service thread with a distributed thread identification to allocate said first service thread to perform operations for a distributed transaction, said distributed thread mechanism passing said distributed thread identification with calls to a remote system in said distributed transaction, and wherein said distributed thread mechanism associates a second service thread on said remote system with said distributed thread identification to allocate said second service thread to perform operations for said distributed transaction on said remote system; and
 (B) signal bearing media bearing said distributed thread mechanism.

13. The program product of claim 12 wherein the signal bearing media comprises recordable media.

14. The program product of claim 12 wherein the signal bearing media comprises transmission media.

15. The program product of claim 12 wherein said distributed thread mechanism comprises a distributed thread context object.

16. The program product of claim 12 said distributed thread mechanism further includes at least one communication-in-thread that receives incoming remote calls, and wherein said at least one communication-in-thread parses said distributed thread identification from said incoming remote call and passes said remote call to said first dedicated service thread associated with said distributed thread identification.

17. The program product of claim 12 wherein said distributed thread mechanism further includes at least one communication-out-thread that receives callbacks, and wherein said at least one communication-out-thread passes said callback to said first dedicated service thread.

18. An apparatus comprising:
 a client system, said client system including:
  a) at least one client processor;
  b) a client memory coupled to the at least one client processor;
  c) a client object residing on said client memory;
  d) a first distributed thread, said first distributed thread residing in said client memory, said first distributed thread including;
   i) a client dedicated service thread, said client dedicated service thread associated with a distributed thread identification, said distributed thread identification corresponding to a distributed transaction such that said client dedicated service thread is allocated to perform operations on said client system for said distributed transaction;
 a server system, said server system including:
  a) at least one server processor;
  b) a server memory coupled to the at least one server processor;
  c) a server object residing on said server memory;
  d) a second distributed thread, said second distributed thread residing on said server memory, said second distributed thread including;
   i) a server dedicated service thread, said server dedicated service thread associated with said distributed thread identification such that said server dedicated service thread is allocated to perform operations on said server system for said distributed transaction, said distributed transaction comprising a plurality of remote method calls between said client object and said server object.

19. The apparatus of claim 18 wherein said first distributed thread comprises a first distributed thread context object and wherein said second distributed thread comprises a second distributed thread context object.

20. The apparatus of claim 18 wherein said first distributed thread resides in a first java virtual machine on said client system and wherein said second distributed thread resides in a second java virtual machine on said server system.

21. The apparatus of claim 18 wherein said second distributed thread further includes at least one communication-in-thread for receiving incoming remote method calls and wherein said at least one communication-in-thread parses said distributed thread identification from said incoming remote method calls and passes said remote method call to said server dedicated service thread associated with said distributed thread identification.

22. The apparatus of claim 18 wherein said first distributed thread further includes at least one communication-out-thread for receiving returned values from said server object, and wherein said at least one communication-out-thread passes said returned values to said first dedicated service thread.

23. A method for allocating threads during a remote method call between a client object on a client system and a server object on a server system in a distributed object environment, the method comprising the steps of:
   a) creating a distributed thread identification;
   b) associating a client dedicated service thread on the client system with said distributed thread identification;
   c) passing a method call from said client object on said client system to said server system and passing said distributed thread identification with said method call;
   d) receiving said method call and said distributed thread identification on said server system; and
   e) passing said remote call to a server dedicated service thread on the server system associated with said distributed thread identification, said server dedicated service thread retrieving said server object and invoking said remote call on said server object.

24. The method of claim 23 further comprising the step of passing a return value from said server object to a communication-out-thread on said client system.

25. The method of claim 23 wherein the step of passing said remote call to a server dedicated service thread on the server system associated with said distributed thread identification comprises:
   i) selecting a server dedicating service thread from a pool of dedicated service threads;
   ii) associating said selected server dedicated service thread with said distributed thread identification; and
   iii) passing said remote call to said selected server dedicated service thread.

26. The method of claim 23 wherein the step of passing said remote call to a server dedicated service thread on the server system associated with said distributed thread comprises passing the said remote call to a server dedicated service thread associated with said distributed thread identification during a previous remote call between said client object and said server object.

27. The method of claim 23 wherein the step of passing a method call from said client object on said client system to said server system comprises obtaining a proxy object on said client system for said server object and invoking said method call on said proxy object.

28. The method of claim 23 further comprising the step of associating a communication-out-thread on said client system with said distributed thread identification to wait for any return value from said server object.

29. The method of claim 23 wherein the step of receiving said method call and said distributed thread identification on said server system comprises receiving by a communication-in-thread, said communication-in-thread parsing said distributed thread identification.

30. An apparatus comprising:
   a client system, said client system including:
      a) at least one client processor;
      b) a client memory coupled to the at least one client processor;
      c) a first java virtual machine residing in said client memory, said first java virtual machine including a client object;
      d) a first distributed thread, said first distributed thread residing on said first java virtual machine, said first distributed thread including;
         i) a client dedicated service thread;
         ii) at least one client communication-in-thread;
         iii) at least one client communication-out-thread;
         iv) a client distributed thread context object, said client distributed thread context object controlling the association of said client dedicated service thread, said at least one client communication-in-thread, and said at least one client communication-out-thread with a remote transaction comprising a plurality of remote method calls between said client object and a server object;
   a server system, said server system including:
      a) at least one server processor;
      b) a server memory coupled to the at least one server processor;
      c) a server java virtual machine residing in said server memory, said server java virtual machine including said server object;
      d) a second distributed thread, said second distributed thread residing on said server java virtual machine, said second distributed thread including;
         i) a server dedicated service thread;
         ii) at least one server communication-in-thread;
         iii) at least one server communication-out-thread; and
         iv) a server distributed thread context object, said server distributed thread context object controlling the association of said server dedicated service thread, said at least one server communication-in-thread, and said at least one server communication-out-thread with said remote transaction.

31. A method for performing a transaction between a client object on a client system and a server object on a server system comprising a plurality of remote method calls between said client object and said server object that maintains consistent thread allocation during said plurality of remote method calls, the method comprising the steps of:
   a) creating a distributed thread identification;
   b) associating a client dedicated service thread on the client system with said distributed thread identification;
   c) getting said a proxy object for said server object on said client dedicated service thread;
   d) calling a remote method call on said proxy object and passing said distributed thread identification to said proxy object;
   e) passing said remote method call and said distributed thread identification to said server system;
   f) getting a communication-out-thread on said server system to wait for any return value;
   g) putting said client dedicated service thread in a waiting state;
   h) receiving said remote method call and said distributed thread identification by a communication-in-thread on said server system;
   i) associating a server dedicated service thread on said server system with said distributed thread identification;
   j) passing said remote method call to said server dedicate service thread;
   k) getting said server object by said server dedicated service thread; and
   l) calling said remote method call on said server object.

* * * * *